(12) United States Patent
Borgeson et al.

(10) Patent No.: US 7,565,314 B2
(45) Date of Patent: Jul. 21, 2009

(54) BID POSITIONING SYSTEM

(75) Inventors: Gregg Borgeson, Key Biscayne, FL (US); Robert Gordon Wilson, Key Biscayne, FL (US)

(73) Assignee: Manhattan Associates, Inc., Atlanta, GA (US)

( * ) Notice: Subject to any disclaimer, the term of this patent is extended or adjusted under 35 U.S.C. 154(b) by 256 days.

(21) Appl. No.: 10/385,281

(22) Filed: Mar. 10, 2003

(65) Prior Publication Data

US 2003/0236739 A1      Dec. 25, 2003

Related U.S. Application Data

(63) Continuation of application No. 09/536,118, filed on Mar. 27, 2000, now abandoned.

(60) Provisional application No. 60/172,084, filed on Dec. 23, 1999.

(51) Int. Cl.
*G06Q 40/00* (2006.01)

(52) U.S. Cl. .............. 705/37; 705/26; 705/28; 705/27; 705/36; 705/35; 395/201

(58) Field of Classification Search ........... 705/26–28, 705/35–37, 8, 400; 345/173; 235/492; 395/201
See application file for complete search history.

(56) References Cited

U.S. PATENT DOCUMENTS 5,222,018 A    6/1993   Sharpe et al. ............... 364/406

(Continued)

FOREIGN PATENT DOCUMENTS

EP           1 041 5 02 A2     3/2000

(Continued)

OTHER PUBLICATIONS

Helen O'Neill "Modern-day pirates still sail the seas Shipping; They commandeer luxury yachts, storm oil tankers and take over cargo ships." Orange County Register. Santa Ana, Calif.: Dec. 16, 1999. p. A.16.*

(Continued)

*Primary Examiner*—Harish T Dass
(74) *Attorney, Agent, or Firm*—Howrey LLP

(57) ABSTRACT

The invention relates to both a method and a computer system that are designed to provide a bid positioning system using a computerized bid proxy. The bid proxy takes instructions from the bidder and then bids based upon these instructions. Using a bid positioning system allows this bidder to place its bids in relation to a lead bid placed by another bidder in an auction based upon either a nominal or percentage distance from the lead bid. In a preferred embodiment, this computerized bid proxy is used in a shipment management system. This system allows a shipper to present at least one shipping requirement for a particular shipment to a centralized server. These shipping requirements could include the origin and destination of a shipment, the time or delivery date of a shipment, the number of articles being shipped, and the weight or volume of the shipment. The server next sends the at least one shipping requirement to a plurality of carriers some of whom are chosen by the shipper and some of whom are chosen by the system. These carriers next bid based upon the at least one shipping requirement. This system and method also allows these carriers to re-quote their bids based upon the bids presented by the other carriers. Once all of the bid deadline has been reached, the shipper picks the quote that best suits the shipper.

23 Claims, 14 Drawing Sheets

U.S. PATENT DOCUMENTS

| | | | | |
|---|---|---|---|---|
| 5,608,778 | A | | 3/1997 | Partridge, III |
| 5,724,524 | A | | 3/1998 | Hunt et al. .................. 395/237 |
| 5,809,479 | A | | 9/1998 | Martin et al. .................. 705/11 |
| 5,822,716 | A | | 10/1998 | Morell et al. .................. 702/55 |
| 5,826,244 | A | * | 10/1998 | Huberman .................. 705/37 |
| 5,835,377 | A | * | 11/1998 | Bush .......................... 700/99 |
| 5,835,716 | A | | 11/1998 | Hunt et al. ............. 395/200.43 |
| 5,835,896 | A | | 11/1998 | Fisher et al. .................. 705/37 |
| 5,890,138 | A | | 3/1999 | Godin et al. .................. 705/26 |
| 5,960,408 | A | | 9/1999 | Martin et al. .................. 705/11 |
| 6,006,199 | A | | 12/1999 | Berlin et al. .................. 705/26 |
| 6,021,398 | A | | 2/2000 | Ausubel ....................... 705/37 |
| 6,035,289 | A | * | 3/2000 | Chou et al. .................. 705/37 |
| 6,058,379 | A | | 5/2000 | Odom et al. |
| 6,064,981 | A | * | 5/2000 | Barni et al. .................. 705/26 |
| 6,078,906 | A | | 6/2000 | Huberman .................. 705/37 |
| 6,285,989 | B1 | | 9/2001 | Shoham ....................... 705/37 |
| 6,499,018 | B1 | * | 12/2002 | Alaia et al. .................. 705/37 |
| 6,564,192 | B1 | | 5/2003 | Kinney, Jr. et al. |
| 6,609,112 | B1 | | 8/2003 | Boarman et al. |
| 6,647,373 | B1 | * | 11/2003 | Carlton-Foss ................ 705/37 |
| 6,976,007 | B1 | * | 12/2005 | Boucher et al. ............... 705/28 |

FOREIGN PATENT DOCUMENTS

| | | |
|---|---|---|
| KR | 99-78937 | 11/1999 |
| KR | 00/6796 | 2/2000 |
| KR | 00/49360 | 8/2000 |
| WO | WO97/45814 | 12/1997 |
| WO | WO 98/48366 | 10/1998 |
| WO | WO 01/57614 | 8/2001 |

OTHER PUBLICATIONS

Sean Graham-White "Do you know where your boxcar is?" Trains. Milwaukee: Aug 1999.vol. 59, Iss. 8; p. 48, 6 pgs.*

Wong Joon San, "New FedEx software offers access via PCs", South China Morning Post. Hong Kong: Jun. 22, 1998. p. 6 [proquest ID 30363079].*

* cited by examiner

FIG. 3A

| INITIAL BID 52 | BID FLOOR 54A | BID POSITION 56 |
|---|---|---|
| | | |
| | | |
| | | |
| | | |
| | | |

| INITIAL BID 52 | BID CEILING 54B | BID POSITION 56 |
|---|---|---|
|  |  |  |
|  |  |  |
|  |  |  |
|  |  |  |
|  |  |  |
|  |  |  |

| | | |
|---|---|---|
| YOUR REFERENCE NO 151 | DESTINATION CITY 156 | CARRIER #1 161 |
| DATE I NEED THE BIDS 152 | DESTINATION COUNTRY/STATE 157 | CARRIER #2 162 |
| TIME I NEED THE BID 153 | WEIGHT IN POUNDS 158 | CARRIER #3 163 |
| DATE SHIPMENT READY 154 | DIMENSIONS IN FT3 159 | CHARGES PAID BY 164 |
| DELIVERY DEADLINE 155 | NUMBER OF PIECES 160 | OTHER INFORMATION 165 |

150

| RFQ SHIP REFERENCE NO. 151A | A23 | DESTINATION CITY 156 | BEDFORD | CARRIER #1 161 | MSAS |
|---|---|---|---|---|---|
| DATE I NEED THE BIDS 152 | 10/15/99 | DESTINATION COUNTRY/STATE 157 | UK | CARRIER #2 162 | EMERY |
| TIME I NEED THE BID 153 | 10:30 A.M. | WEIGHT IN POUNDS 158 | 458 | CARRIER #3 163 | BRITISH AIRWAYS |
| DATE SHIPMENT READY 154 | 10/15/99 | DIMENSIONS IN FT 3 159 | APPROX 18 FT3 | CHARGES PAID BY 164 | SHIPPER |
| DELIVERY DEADLINE 155 | 10/19/99 | NUMBER OF PIECES 160 | 9 | OTHER INFORMATION 165 | |

167 →

| BID RESPONSE MSAS 240 | ANY ADDITIONAL INFORMATION THAT YOU WANT SHIPPER TO SEE 242 | DIRECT SERVICE ON VIRGIN ATLANTIC 244 | |
|---|---|---|---|
| | OPENING BID 246 | LOWEST BID 248 | |
| CHARGES AT ORIGIN 250 | $48.50 | $39.00 | |
| TRANSPORTATION 252 | $385.00 | $294.00 | |
| CHARGES AT DESTINATION 254 | $0.00 | $0.00 | |
| TOTAL CHARGES 256 | 433.50 | 333.50 | |
| MATCH LOWEST BID 260 | Bid Positioning 258 | Tell us how to adjust your bid.... | |
| | GO BELOW LOWEST BID BY __ % 262 | BE ABOVE LOWEST BID BY __ % 264 | |
| BID FLOOR: 270 | BID CEILING 272 | | |

FIG. 6

| YOUR REFERENCE NO 151 | A23 | DESTINATION CITY 156 | BEDFORD | CARRIER #1 161 | MSAS |
|---|---|---|---|---|---|
| DATE I NEED THE BIDS 152 | 10/15/99 | DESTINATION COUNTRY/STATE 157 | UK | CARRIER #2 162 | EMERY |
| TIME I NEED THE BID 153 | 10:30 A.M. | WEIGHT IN POUNDS 158 | 458 | CARRIER #3 163 | BRITISH AIRWAYS |
| DATE SHIPMENT READY 154 | 10/15/99 | DIMENSIONS IN FT 3 159 | APPROX 18 FT3 | CHARGES PAID BY 164 | SHIPPER |
| DELIVERY DEADLINE 155 | 10/19/99 | NUMBER OF PIECES 160 | 9 | OTHER INFORMATION 165 | |

168 →

| COLUMN 1 YOUR SELECTED CARRIERS 170 | COLUMN 2 TOTAL COST 171 | COLUMN 3 CARRIER'S COMMENTS: 172 | COLUMN 4 QUALITY BOOKINGS MISSED % 173 | COLUMN 5 QUALITY CUSTOMER COMPLAINT % 174 | COLUMN 6 175 BOOK IT ? |
|---|---|---|---|---|---|
| MSAS | $333.00 | DIRECT SERVICE ON VIRGIN ATLANTIC | 16% | 1.2% | NO |
| EMERY | $330.00 | NONE | 23% | 0.7% | NO |
| BRITISH AIRWAYS | 386.34 | DAILY FLIGHTS | 11% | 3.7% | NO |
| YOU ALSO MIGHT CONSIDER.... 177 | | | | | |
| CIRCLE | 316.29 | DIRECT SERVICE ON BRITISH AIRWAYS | 11% | 2.1% | NO |
| EXPEDITORS | 345.61 | NONE | 8% | 1.1% | NO |
| CARGO U.K. | 295.00 | VIA MCO | 26% | 0% | NO |

| YOUR REFERENCE NO 151 | A23 | DESTINATION CITY 156 | BEDFORD | CARRIER #1 161 | MSAS |
|---|---|---|---|---|---|
| DATE I NEED THE BIDS 152 | 10/15/99 | DESTINATION COUNTRY/STATE 157 | UK | CARRIER #2 162 | EMERY |
| TIME I NEED THE BID 153 | 10:30 A.M. | WEIGHT IN POUNDS 158 | 458 | CARRIER #3 163 | BRITISH AIRWAYS |
| DATE SHIPMENT READY 154 | 10/15/99 | DIMENSIONS IN FT 3 159 | APPROX 18 FT3 | CHARGES PAID BY 164 | SHIPPER |
| DELIVERY DEADLINE 155 | 10/19/99 | NUMBER OF PIECES 160 | 9 | OTHER INFORMATION 165 | |

178

| YOU SELECTED 170 | TOTAL COST 171 | CARRIER'S COMMENTS 172 | QUALITY BOOKINGS HONORED 173 | QUALITY CUSTOMER COMPLAINTS 174 | BOOK IT? 175 |
|---|---|---|---|---|---|
| MSAS | $333.00 | DIRECT SERVICE ON VIRGIN ATLANTIC | 16% | 1.2% | YES! |

| COSIGNEE COMPANY NAME 180 | HER MAJESTY'S IMPORTS |
|---|---|
| COSIGNEE CONTACT NAME 181 | TREVOR BROWN |
| COSIGNEE CONTACT'S EMAIL OR FAX 182 | TBROWN@HML.UK.CO |
| PLEASE SCHEDULE PICK UP AT MY LOCATION 183 | Yes |
| PLEASE CALL TO SCHEDULE PICK UP 184 | no |

FIG. 9

| DATE 191 | YOUR REF# 192 | COSIGNEE 193 | CARRIER 194 | BOOKED 195 | ACUTAL 196 | STATUS 197 |
|---|---|---|---|---|---|---|
| 10/15/99 | A23 | LHR-HER MAJESTY'S IMPORTS | MSAS | VA 123/17 | VA 123/17 | ENROUTE |
| 10/12/99 | A17 | SFO-VALLEY ELECTRONICS | EMERY | AA 111/13 | AA 173/17 | DELIVERED |
| 10/12/99 | A16 | NRT TOKYO SERVICES | MSAS | JL 173/13 | JL 173/13 | DELIVERED |
| 10/11/99 | A14 | JFK LONG ISLAND ELEC | YELLOW TRUCKING | DELIVER ON 14TH | DELIVERED ON 14TH | DELIVERED |
| 10/9/99 | A13 | ORD NORTH SHORE ELECTRONICS | BAX GLOBAL | UA 253/9 | UA 253/9 | DELIVERED |

190

| CARRIER 201 | NUMBER OF SHIPMENTS IN LAST 90 DAYS 202 | NUMBER WITH TRACKING DATA 203 | PERCENT WITHOUT TRACKING DATA 204 | NUMBER OF MISSING BOOKED FLIGHT OR DELIVERY 205 | % OF MISSING BOOKED FLIGHT MY SHIPMENTS 206 | % MISSING BOOKED FLIGHT ALL RFQSHIP CUSTOMERS 207 |
|---|---|---|---|---|---|---|
| | | | | | | |
| | | | | | | |
| | | | | | | |
| | | | | | | |
| | | | | | | |
| | | | | | | |

FIG. 10

BID POSITIONING SYSTEM

The present invention is a continuation of, claims priority from, and incorporates by reference the entirety of U.S. patent application(s): application Ser. No. 09/536,118, which was filed Mar. 27, 2000, now abandoned, and which claims priority from and incorporates by reference the entirety of U.S. Provisional patent application No. 60/172,084, which was filed on Dec. 23, 1999.

BACKGROUND OF THE INVENTION

The invention relates to a method and a system for providing a bid proxy that places bids for a bidder in an auction based upon bid parameters such as an initial bid, a bid ceiling, a bid floor and a bid position. While the bid ceiling and the bid floor establish the range of bids, the bid position sets how close each bidder wants to remain to a leading bid.

SUMMARY OF THE INVENTION

The invention relates to a method and a system for providing a bid proxy for a bidder in an online auction. The bid proxy sets each bid based upon bid instructions or parameters sent from each bidder. These bid instructions include an initial bid, a bid ceiling in a traditional auction, a bid floor in a reverse auction, and a bid position. Once an initial bid is set by the bidder, the bid ceiling sets how high the bid proxy could bid, the bid floor sets how low the bid proxy could bid, while the bid position sets how close the bid proxy bids in relation to a leading bid. In a traditional auction, the leading bid is the highest bid cast by the other bidders while in a reverse auction, the leading bid is the lowest bid cast by other bidders. These bidders would set their bid position as the distance from this leading bid based upon a percentage of the leading bid, or as a nominal dollar or other currency distance from the leading bid. In addition, these bidders would set the distance and position from the leading bid based upon their own perception of qualitative characteristics or on their pricing or marketing strategy. In most cases, these qualitative characteristics are the reputation for the quality and the reliability of the bidder's services or goods.

For example, a bidder with high perceived quality characteristics or high perceived reliability might set its bid position as either ten percent or ten dollars lower than the leading bid in a traditional auction, or in the alternative, ten percent or ten dollars higher than the leading bid in a reverse auction. Conversely, a bidder with an aggressive pricing strategy or a set of low perceived quality characteristics would set its bid as either ten percent or ten dollars higher than the leading bid in a traditional auction and ten percent or ten dollars lower in a reverse auction. Therefore, in this case, a bidder with the lowest perceived quality characteristics in a group of competing bidders in a single auction would want to instruct the bid proxy to repeatedly reset its bid so that they are the leading bidders.

The invention therefore creates an automated method for imitating the way pricing is often determined in traditional, non-automated environments. Buyers often seek preferred vendors with pricing that is near the leading market level, but not necessarily at the leading level.

In a preferred embodiment, this bid proxy system could be used in conjunction with a computer network for providing a computerized shipment management system. This system allows a shipper to present one or more shipping requirements for a particular shipment to be auctioned off through a centralized server. These shipping requirements include the origin and destination of a shipment, the time or delivery date of a shipment, the number of articles being shipped, or the weight or volume of the shipment. The server next sends these shipping requirements to a plurality of carriers. Once the appropriate carriers determine whether to bid in a reverse auction on this shipment, each carrier would select an initial bid, a bid floor, and a bid position. Thus, for example, one particular bidding carrier might select an initial bid of $400 for a particular shipment with a bid floor of $300 and a bid position as 10% higher than the lead bid. Through a preliminary round of bidding, another bidder may set the leading bid to be $350. Therefore, the bid proxy would reset the bid for the initial bidder to be $385, or 10% higher than $350. If the bidding continued to drop as other bids are entered so that the lead bid drops to $320, then the bid proxy would reset the particular bidding carrier to have a bid of $352, or 10% higher than the current lead bid. If the billing continues to fall further so that the lead bid fell to $200, the bid proxy would hold the final bid for that particular bidder to $300, or its bid floor.

Each bidding carrier can make a judgment as to how a customer or shipper might perceive its reputation for quality in terms of delivery performance record, billing accuracy, shipment tracking capabilities, and other factors. Because the customer will probably take into account their own perception of quality, the carrier can use bid positioning to insure that its final bid reflects this perception. In addition, the carrier can use bid positioning to reflect an aggressive or conservative pricing strategy for its product in the market.

In a single step, the carrier can enter its initial bid, its bid floor, and its bid position. Thus, the carrier does not have to continuously participate in the auction to determine whether its offer is still competitive because the automated proxy is constantly adjusting the bid to the exact desired position in relation to the lowest bid offered.

The auction system may be embedded in a shipment management system that brings other benefits to the shipper. Once the shipper selects a carrier, the system creates a booking or reservation between the shipper and that carrier. The shipment management system tracks the shipment for the shipper by accessing automated database and creating a table to allow the shipper to check the delivery status of each of his shipments. The shipment management system also compares the actual performance from the tracking system against the promised performance by the carrier, and creates for the shipper various reports and tables comparing the performance of one carrier to another. The shipment management system also displays the carrier performance data to the shipper when the shipper is evaluating bids from various carriers during an auction.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 3A is a schematic diagram of a bid proxy prompt screen for a reverse auction;

FIG. 3B is a schematic diagram of a bid proxy prompt screen for a traditional auction;

FIG. 5 is a schematic diagram of a shipping information screen;

FIG. 6 is a schematic diagram of a carrier bidding input screen;

FIG. 7 is a schematic diagram of a screen presented to the shipper containing bid results;

FIG. 8 is a schematic diagram of a booking screen;

FIG. 9 is a schematic diagram of a shipment tracking system screen;

FIG. 10 is a schematic diagram of a performance report screen; and

DETAILED DESCRIPTION OF THE PREFERRED EMBODIMENT

Figure 1:
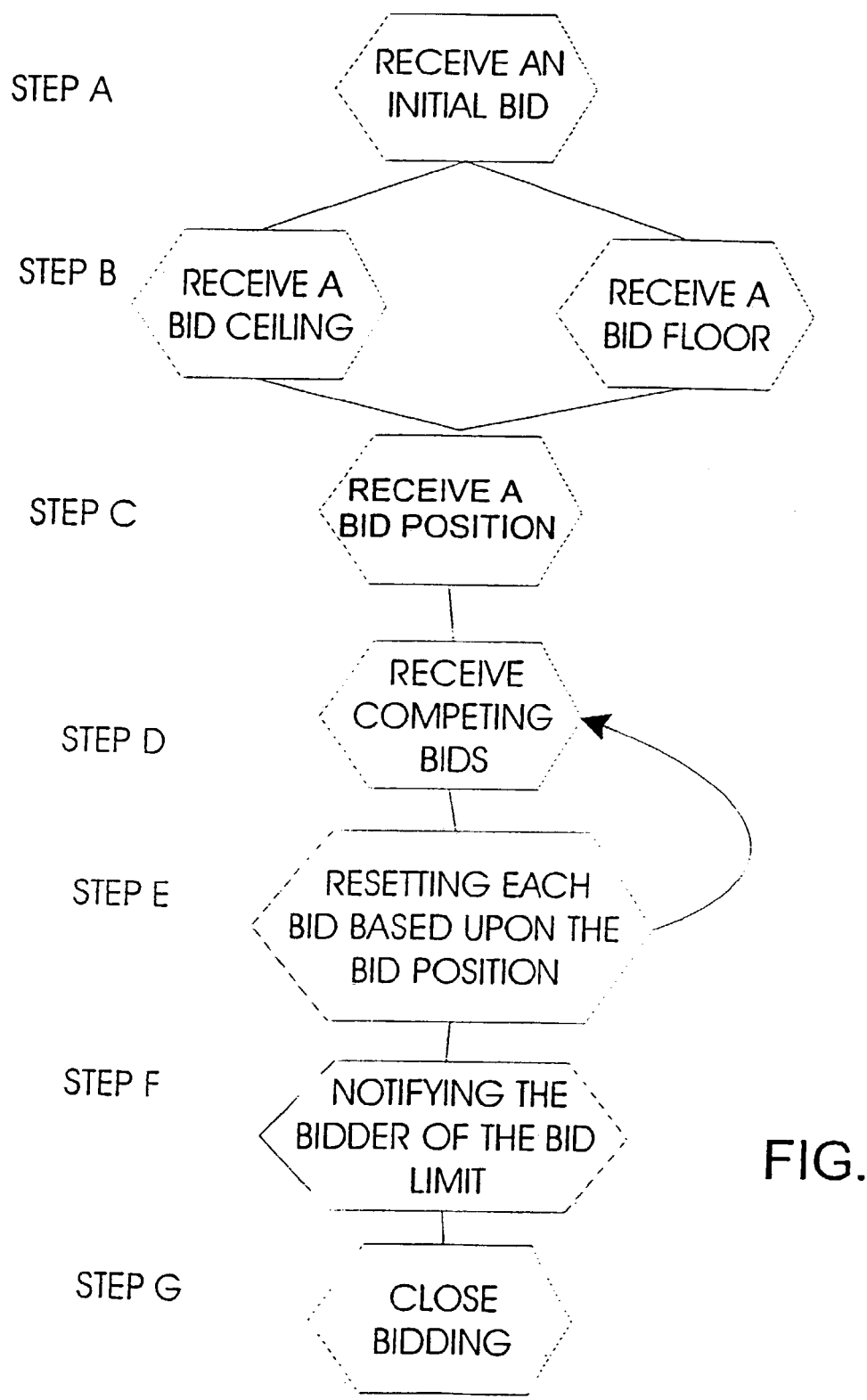
FIG. 1 is a flow diagram illustrating the process for the bid positioning system according to the invention.
Figure 2:
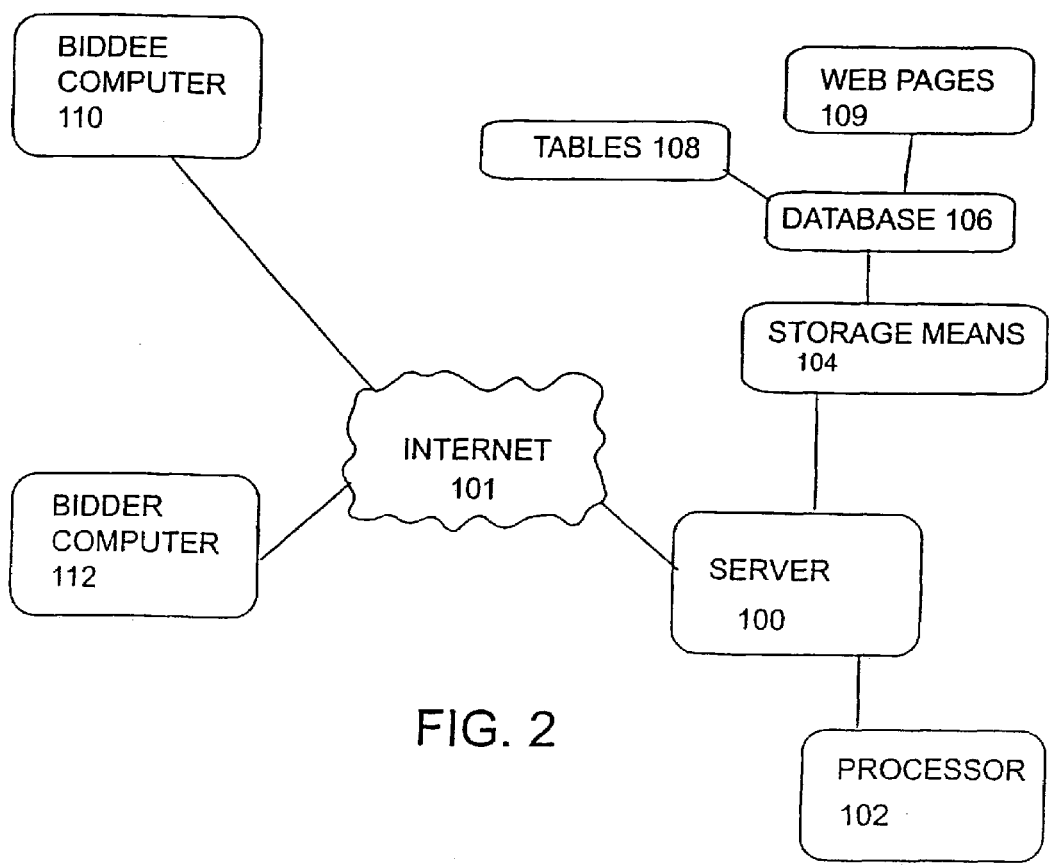
FIG. 2 is a schematic diagram of the computer network for the bid positioning system.

Referring to the drawings, FIG. 1 shows a flow chart of the bid proxy system for a computerized auction. In step A, the system that is housed on server 100 as shown in FIG. 2 receives an initial bid from an individual bidder. Next in step B, the system receives a bid limit such as a bid ceiling or a bid floor from the bidder. These bidders are logged on to at least one of the remote bidding computers 112. The computer system for this process is shown in FIG. 2 showing a central server 100 that is in communication with at least one remote input device such as a biddee computer 110 or a bidder computer 112 through the Internet 101. Biddee computer 110 is used by persons who are interested in receiving quotes or bids, while bidder computer 112 is used by persons making quotes or bids to the people requesting these quotes or bids. Connecting these two computers is server 100 that has a processor 102 and storage means 104. Storage means 104 could be any form of hard drive or removable data storage device for storing data so that it houses a database 106 that has a series of tables 108. Tables 108 also relate to a series of web pages 109 having prompts and entry fields shown in FIGS. 3A and 3B and in FIGS. 5-11.

Figure 3A:
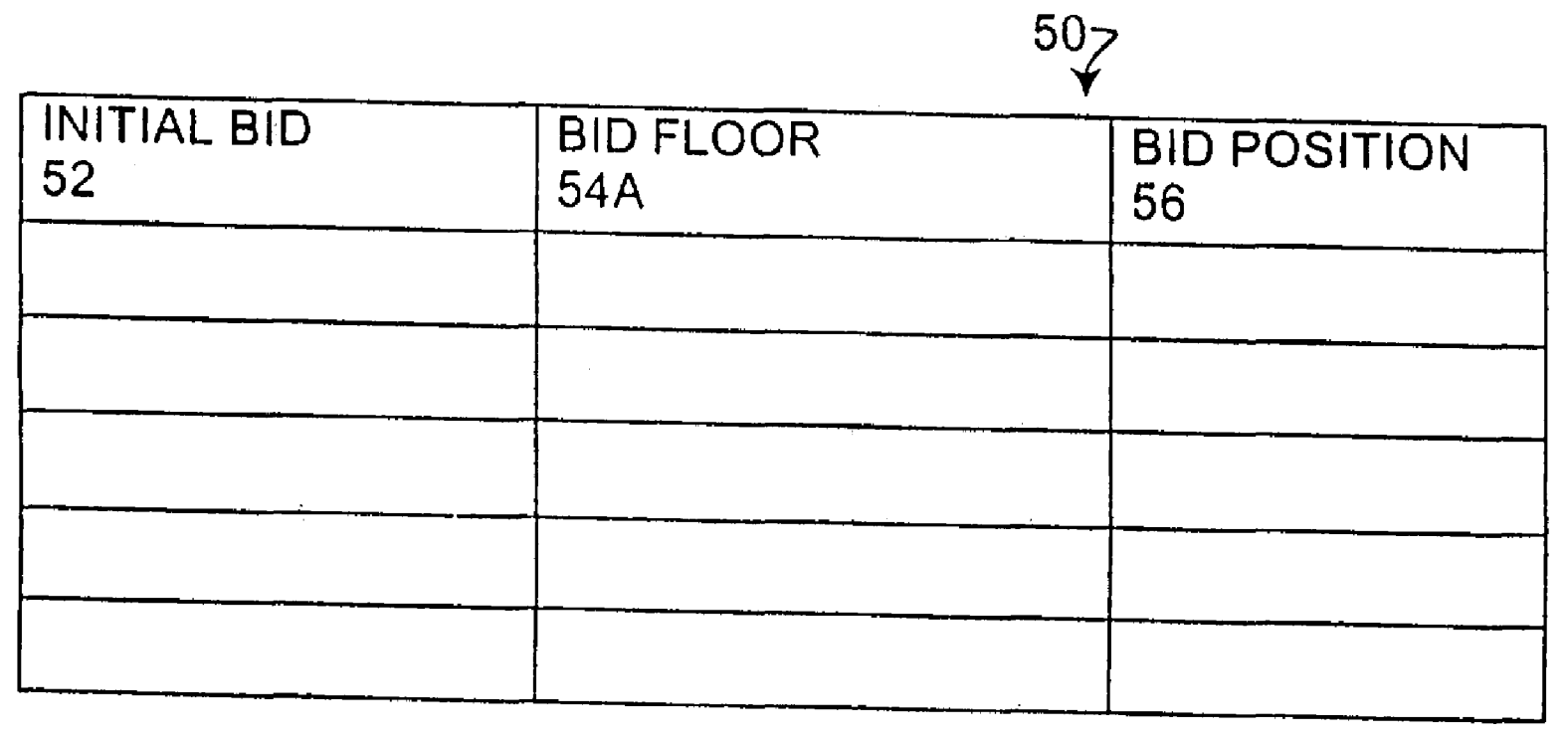
Figure 3B:
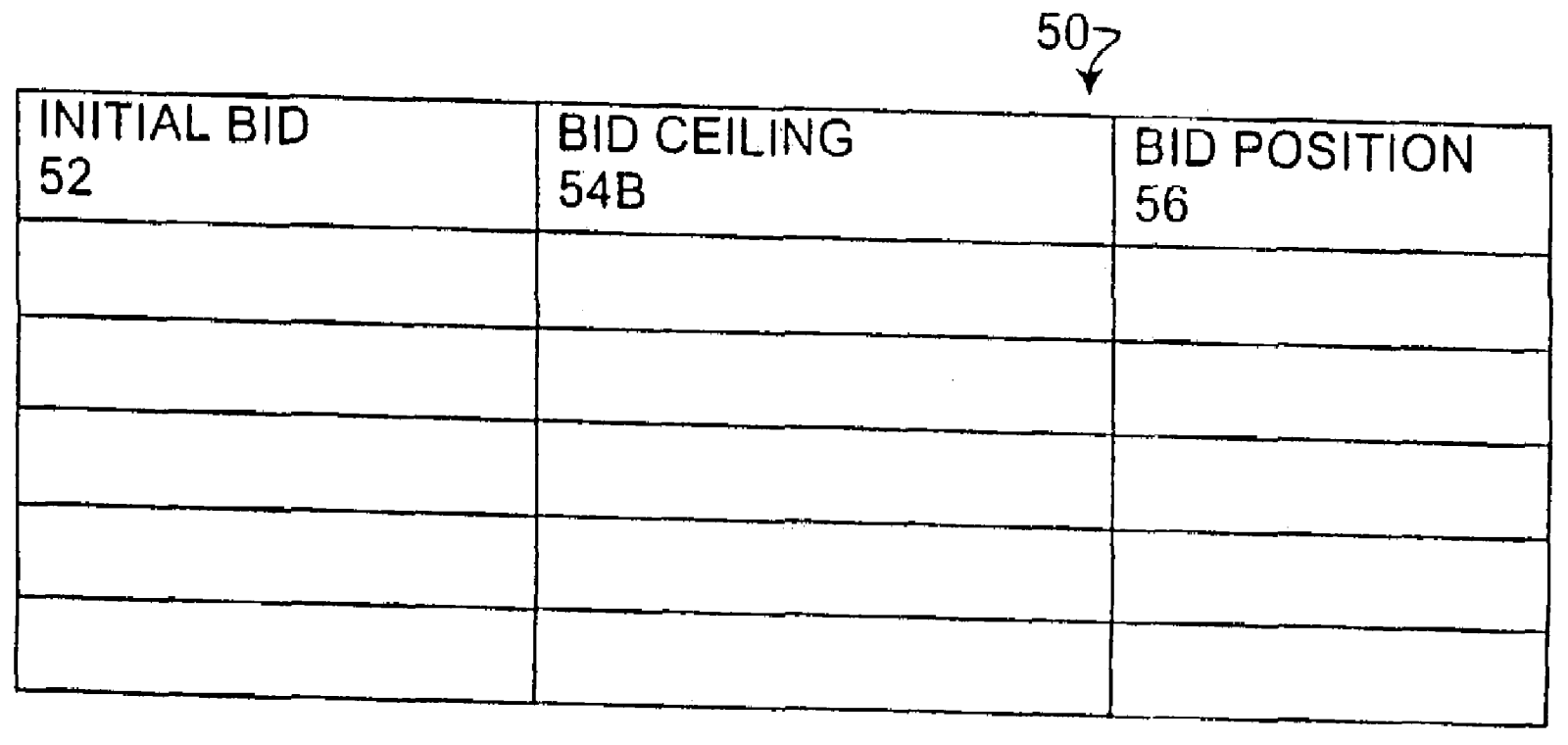

In this case, as shown in the process of FIG. 1, and in the screen embodiment 50a and 50b of FIGS. 3A and 3B, each one of the bidders can insert an initial bid 52. In step B, the system could also receive a bid floor 54a and a bid ceiling 54b. Next, in step C, a bid position 56 is received from the bidder to establish a position for that bidder relative to the lead bid. Next, the bidder assigns the system to be his bid proxy, to adjust the bidder's bid based upon the bid position and the lead bid. In step D, the auction is opened to all bidders simultaneously so that all of the bidders can bid on a particular product or service offered by the biddee. Next, in step E, the bid proxy continuously adjusts bids for each bidder based upon the bid positioning system during the bidding period.

Figure 4A:
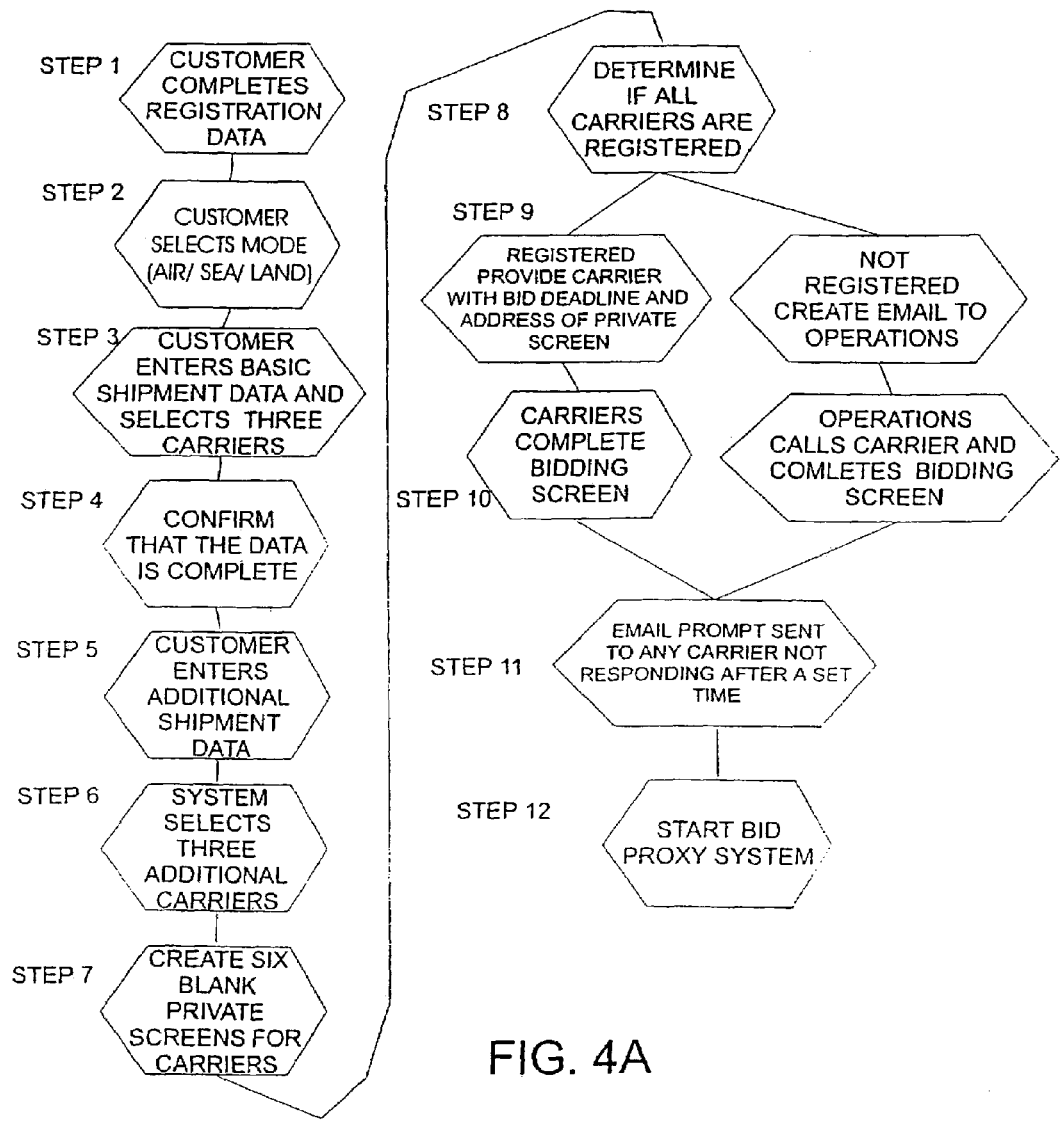
FIG. 4A is a flow diagram of the software of the preferred embodiment.
Figure 4B:
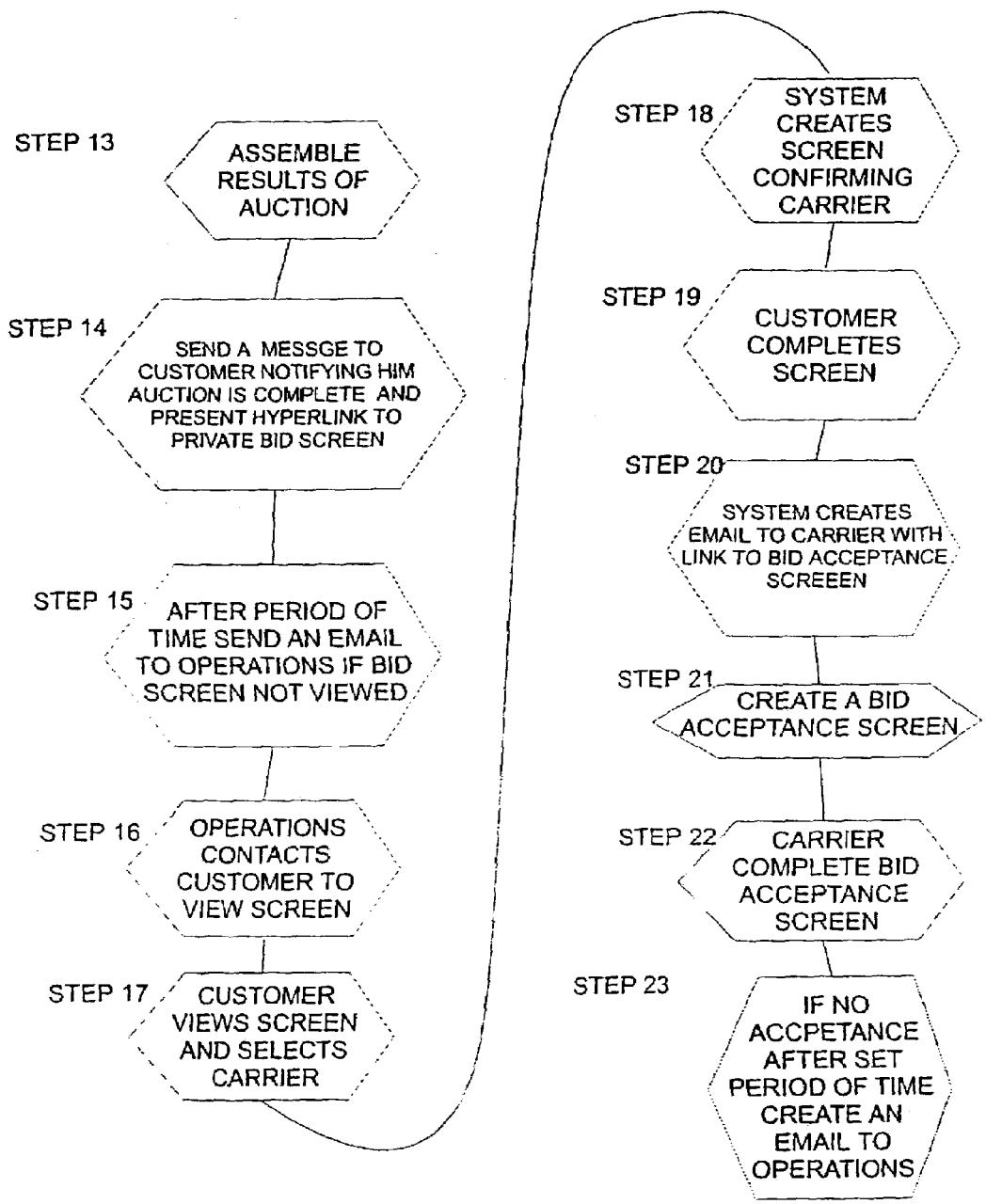
FIG. 4B is a continuation of the flow diagram of the software of the preferred embodiment.
Figure 4C:
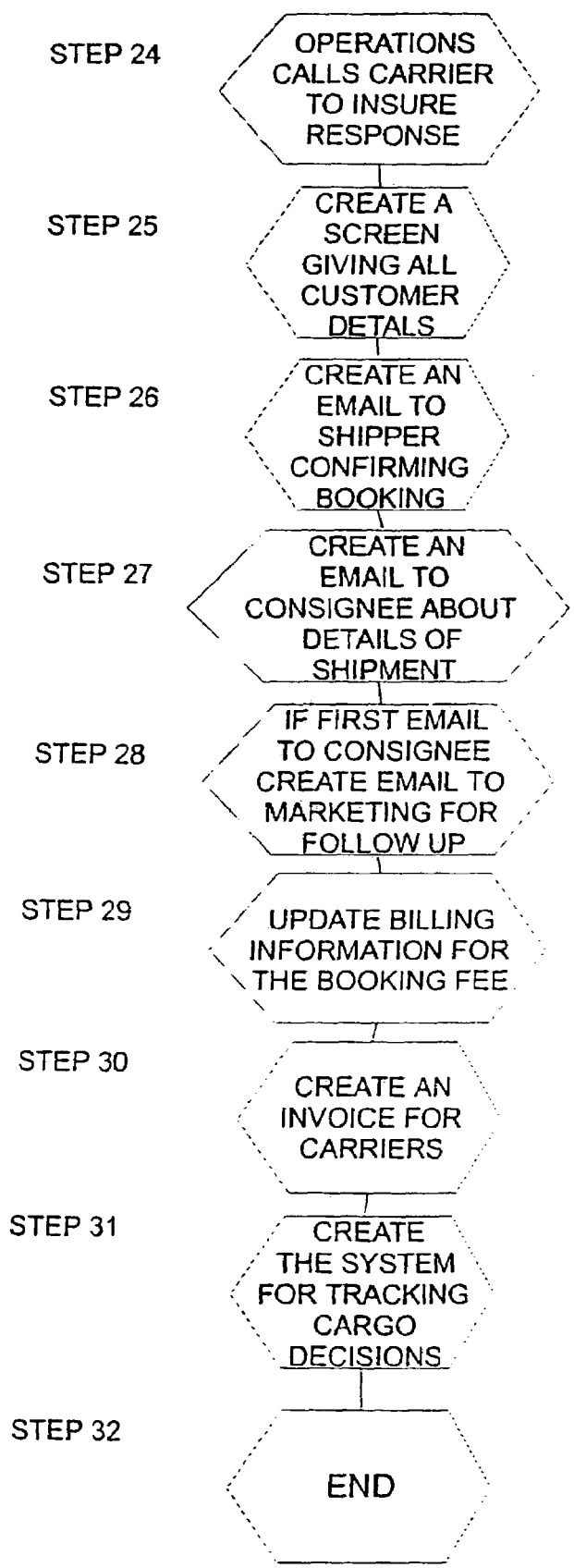
FIG. 4C is a continuation of the flow diagram of the software of the preferred embodiment.

In the preferred embodiment, as shown in FIGS. 4A, 4B, and 4C, this bid proxy having a positioning system is used in a computerized auction for a shipment management system. In this case, the method for the shipment management system is performed over a computer network such as the Internet. In addition, a server 100 is used to host a computerized system that controls the method. The server may run a Unix operating system, Microsoft NT operating system or any other input system known in the art.

A user, such as a carrier, or a shipper, can interact with the server using a remote computer. A shipper is any person or entity looking to ship products using the shipment management system according to the invention. A carrier is any person or entity in the business of transporting goods and who uses the system to exchange information with the shipper. The shipper logs onto biddee computer 110 to request quotes from a plurality of carriers, and the carrier uses bidder computer 112 to make quotes.

Thus, in the preferred embodiment (as shown in FIG. 4a) in step 1, server 100 (FIG. 2) presents a web page (not shown) over a computer network on biddee computer 110, so that the shipper completes the registration data. Next, in step 2, the shipper selects the mode of transportation for the shipment such as air, sea, or land. In step 3, the shipper enters basic shipment data into web page 150 as shown in FIG. 5 and selects three carriers from a list of carriers stored on a table on database 106. In the alternative, the shipper could select an original carrier not listed in the table on database 106. Here, the system contacts that individual solicited carrier to sign that carrier up to the system.

Essentially, these carriers are split into one of two groups, solicited carriers, and unsolicited carriers. Solicited carriers are those carriers that are selected directly by each shipper. Additionally, unsolicited carriers, are carriers that are selected by the system after the solicited carriers have been selected. Next, in step 4, and in step 5, the shipper confirms whether the data entered is complete and if the data is incomplete, the shipper enters additional shipment data.

After this information is confirmed, in step 6, the system selects and notifies three additional unsolicited carriers from a table in database 106. This selection can be random, the result of another auction or based upon certain the shipping data entered by the shipper. This data includes the date that the shipper needs the bids 152, the deadline for the bidding to end 153, the date the shipment will be ready 154, the delivery deadline 155, the destination city 156, the destination country 157, the weight of the shipment in pounds or kilos 158, the dimensions of the shipment 159, the number of pieces 160, the list of the top three preferred carriers 161, 162, 163, a field that lists who pays for the charges 164, and a field for any other information 165. In this step, each one of the selected carriers receives a message inviting them to join in the bidding process.

In step 7, the system creates six separate private bid screens each, as shown in the screen in FIG. 6. The top portion of these screens contains similar information taken from the entry screens that were shown in FIG. 5, with the responses entered by the shipper.

Next, in step 8, the system determines whether the carrier is registered. If the carrier is not registered, then system creates an email, fax, phone, or any other type message to a system manager to personally contact the carrier to register that carrier. Next, in step 9, a person associated with the system contacts the carrier and helps that carrier to fill out the bidding screen in step 10 to register for the system.

In the bottom portion of FIG. 6, each carrier enters its response to the shipper. This screen allows each one of the carriers to instruct a bid proxy on how to bid during the bidding process. In this case, screen 167, as shown in FIG. 6, shows the individual bid response table which lists the individual carrier in field 240, the additional information prompt in field 242, while the additional information answer is disposed in field 244. In addition, the shipping charges for both the opening bid 246 and the lowest bid 248 are broken down into the following categories: charges at origin 250; transportation costs 252; charges at destination 254; and the total charges 256.

Screen 167 also references the bid positioning prompts 258 for each carrier. In this case, there is a prompt to match the lowest bid 270, a prompt to go below the lowest bid by a particular percentage 262, and to go above the lowest bid by a particular percentage 264. The carrier can also enter information about setting a bid ceiling or a bid floor to keep the bid proxy from moving beyond a range preferred by the carrier. Thus, using this system, each carrier can instruct a bid proxy exactly how to bid for it based upon the instructions entered into this screen.

Next, in step 11, the system checks to see whether all of the carriers have filled out their screens. If not, a message is sent to any carrier not responding up to a set period of time such as one hour. A copy of this message is sent to an operations department associated with the system.

In step 12, the system starts the automated bid proxy-bid positioning system for a reverse auction on the shipping system. In this case, as any carrier's private bid is entered, it may cause an adjustment to, or recalculation of, any or all of the other entered bids so that the bids change. Thus, if a particular carrier selects its bid position to be a percentage difference from the lead bid, the process starts by having a first carrier opening bid entered into the system and comparing it to the lowest entered bids from all other carriers. Next, the system performs a calculation comparing the first carrier's chosen bid position against the lowest bid from the other carriers. If the resulting figure from this calculation is greater than the first carrier's opening bid, the system keeps the first carrier's opening bid to leave the bid price the same. However, if the resulting figure is less than the first carrier's lowest bid, then the resulting figure is entered to drive the bid price down. This process is then repeated until the bid deadline is reached, and then the bidding is closed.

Next, in step 13, the system assembles the results of the bidding into screen 168 in FIG. 7. Screen 168 contains all of the information entered into screen 150 in FIG. 5, plus additional information. This additional information includes a listing of the selected carriers 170, the total cost for shipping the shipment 171, the carrier's comments 172, the carrier's percentage of on-time deliveries or their percentage for on-time bookings for transit, a quantitative percentage for quality performance 174, and a question regarding whether the shipper wants to book this quote 175. This information is filled into blank tables 166 to render a data output. In addition, the shipper is presented with an additional listing of unsolicited carriers 177 wherein this listing shows at least one additional carrier.

Next, in step 14, the system sends a message such as an email or fax to the shipper notifying the shipper that the auction is complete and providing the shipper with a means to connect to its own private bid screen. If a reasonable period of time has passed, and the shipper has not responded, in step 15, an additional message is sent to an operations staff that operates the system. Then, in step 16 the operations staff acts upon the shipper's failure to respond by either sending an additional email or making a phone call to see if the shipper wants to accept a bid.

In step 17, the shipper views screen 168 and selects a carrier. Next, in step 18, the system creates an additional screen 178 shown in FIG. 8 which confirms that the shipper selected the carrier and creates fields for consignee information such as the consignee company name 180, the consignee contact name 181, the consignee's email or fax 182, the location of the pick up 183, and whether to call to schedule a pick up 184, and the payment terms. In this case, a consignee is any party to whom the shipper instructs the carrier to deliver the goods.

In step 19, the shipper completes screen 178. In step 20, the system next creates and sends a message such as an email, voice, fax, or any other type of message to the selected carrier informing them that their bid has been accepted, and directing them to a bid acceptance screen.

Next, in step 21, the system creates a bid acceptance screen that contains the shipment details, the agreed price, and the system's fee for matching the shipper to the carrier. In step 22, the carrier completes the bid acceptance screen. To accept shipment, the carrier must confirm this information, and may provide a means for tracking the shipment, such as a number. Larger carriers will have a tracking system that will be used to track the shipment. In step 23, if after a brief period of time such as 60 minutes, the carrier does not accept the shipper's acceptance, the system then creates an email to the operations department associated with the system. Next, in step 24, the operations department takes appropriate action such as calling the carrier to ensure that there is a response.

In step 25, when the carrier's acceptance is received, the system creates a screen for the carrier giving all customer or shipper details such as name, location, phone number, pickup instructions, consignee name, and contact details.

Next, in step 26, the system creates and sends an email to the shipper confirming that the carrier booking has been completed and advises the shipper of the carrier's reference number.

In step 27, the system sends a message to the consignee advising the consignee about the shipment details including the booking and delivery deadline details. The consignee is offered tracking information through the system's online tracking system.

In step 28 the system checks to see if this is the first shipment to the consignee. If it is, the system creates an email to the marketing department for follow-up. Next in step 29, the system updates the billing information for the appropriate booking fee to the selected carrier. Finally, in step 30, the system creates invoices to carriers for use of the system based on a set schedule, such as twice monthly.

The system can also provide additional services for the shipper. In step 31 the system creates a series of screens for tracking cargo decisions. For example, FIG. 9 shows a screen 190 that presents information that tracks the shipments for each individual shipper. This screen lists the date of each shipment 191, the reference number 192, the name of the consignee 193, the name of the carrier 194, the booking reference 195, the actual result 196 as to whether the carrier made its booking or whether the shipped product was delivered. In addition, this screen could also list the status of the delivery 197 such as whether it is en-route or delayed.

In addition, in FIG. 10, there is shown a screen 200 that lists the name of the carrier 201, the number of shipments in the last 90 days 202, the number that each carrier has with tracking data 203, the percentage of shipments without tracking data 204, the number of booked flights missed or delivery 205, the percentage of booked flights missed for each shipment 206, and the percentage of booked flights missed for all of the system's customers 207. This screen is useful because it allows a shipper to see a carrier's history and the quality of their service before using them to ship an item.

Figure 11:
FIG. 11 is a schematic diagram of a costs savings screen.

As shown in FIG. 11, there is a means for tracking a cargo shipping decision-making process. This feature may be used to quantify the kind of decision the shipper has made relative to price and quality. In order to achieve this goal, this system could include summary report screen 210 that shows the cost breakdown for a shipper. This screen includes a recent history of shipments that includes references to a reference number 211, the destination of the shipment 212, the type of carrier selected 213, the price paid vs. the percentage of bookings missed 214, the low offer concerning price and quality 215, and the high offer concerning price and quality 216.

Next, there is a summary breakdown of the average cost paid 217, the average cost offered 218, the average of the lowest offers 219, and the average of the highest offers 220. This breakdown could be based upon the type of shipping process such as land, sea or air shipments. Therefore, this screen allows each shipper to evaluate the decision process by maintaining and compiling the records of the bids and bidders. Finally, in step 32, this process for a shipment management system would end.

Ultimately, this bid positioning system could be used in other types of online auctions. For example, professionals such as doctors, lawyers, accountants, and architects could offer services through an online auction. In this way, they would set the pay scale for their services to be commensurate with the perceived value of their work.

Accordingly, while a few embodiments of the present invention have been shown and described, it is to be understood that many changes and modifications may be made thereunto without departing from the spirit and scope of the invention as defined in the appended claims.

What is claimed is:

1. A method for providing a computerized shipment management system over a computer network, the method comprising the steps of:
   receiving a requirement for a shipment from a shipper over the computer network;
   communicating the requirement to a plurality of carriers over the computer network;
   receiving at least one quote for the shipment from at least one of the plurality of carriers over the computer network, the at least one quote being based on the requirement;
   communicating to the shipper over the computer network the at least one quote for the shipment and additional information regarding the carrier that provided the at least one quote; and
   receiving a selection of one of the at least one quote from the shipper over the computer network, the selection being based on the at least one quote and the additional information regarding the carrier;
   wherein the additional information regarding the carrier includes a quantitative measurement representing the carrier's previous reliability and performance, and
   the shipment requirement includes a list of preferred carriers of the plurality of carriers.

2. The method according to claim 1, further comprising communicating the selection of one of the at least one quote to the plurality of carriers over the computer network.

3. The method according to claim 2, further comprising the step of receiving delivery status tracking information from the carrier that provided the selected quote over the computer network.

4. The method according to claim 1, wherein the computerized shipment management system is used for receiving and selecting quotes for shipments of a plurality of shippers.

5. The method according to claim 1, wherein said step of communicating the requirement to a plurality of carriers includes communicating the requirement to at least one solicited carrier and communicating the requirement to at least one unsolicited carrier.

6. The method according to claim 5, wherein the shipper communicates the shipping requirement to at least one solicited carrier and said shipment management system communicates the requirement to at least one unsolicited carrier.

7. The method according to claim 1, wherein the requirement for a shipment includes a mode of transportation.

8. The method according to claim 1, wherein the step of communicating to the shipper includes displaying the at least one quote for the shipment and additional information regarding the carrier that provided the at least one quote on a computer screen.

9. The method according to claim 1, wherein the additional information regarding the carrier includes quality information data about the carrier.

10. The method according to claim 1, wherein the additional information regarding the carrier includes a percentage of bookings missed by the carrier.

11. The method according to claim 1, wherein the additional information regarding the carrier includes a percentage of customer complaints about the carrier.

12. The method according to claim 1, wherein the additional information regarding the carrier includes a quality performance report concerning the carrier's previous shipments for the shipper.

13. The method according to claim 12, wherein the quality performance report includes a percentage of missed booked flights or missed deliveries of the carrier's previous shipments for the shipper.

14. The method according to claim 12, wherein the quality performance report includes a percentage of shipments by the carrier without tracking data.

15. The method according to claim 1, wherein the step of communicating to the shipper includes communicating to the shipper over the computer network a carrier profile including information about the number of the carrier's employees, the number of the carrier's locations, the carrier's delivery routes and the carrier's pricing information.

16. The method according to claim 1, wherein the step of communicating to the shipper communicating a summary report that shows the cost breakdown for the shipper.

17. The method according to claim 16, wherein the summary report includes the average cost paid by the shipper for previous shipments.

18. The method according to claim 1, further comprising the step of adjusting at least one quote received from the plurality of carriers before communicating the at least one quote to the shipper.

19. The method according to claim 18, wherein said step of adjusting includes adjusting the at least one quote based upon a bid position received from the carrier that provided the at least one quote in relation to a lead quote presented by another carrier.

20. The method according to claim 18, wherein said step of adjusting includes adjusting the at least one quote based upon a bid limit received from the carrier that provided the at least one quote.

21. The method according to claim 1, wherein the at least one quote comprises a plurality of quotes.

22. A computerized system for shipment management, comprising:
   a central server;
   at least one information storage means connected to said server;
   a processor connected to said server for processing information stored on said storage means;

at least one remote input device, said remote input device for inputting information into and receiving information from said server;

a communications means for communicating information from said at least one remote input device to said central server; and a database for storing information about a plurality of carriers and a shipper on said storage means, the database being accessible by the plurality of carriers and the shipper through said at least one remote input device;

wherein said system is accessed by the shipper to input a requirement for a shipment;

wherein said system is accessed by a plurality of carriers to input at least one quote for the shipment based on the requirement;

wherein the system communicates to the shipper the at least one quote for the shipment and additional information regarding the carrier that provided the at least one quote;

wherein said system is accessed by the shipper to select one of the at least one quote based on the at least one quote and the additional information regarding the carrier that provided the at least one quote, the additional information including a quantitative measurement representing the carrier's previous reliability and performance, and wherein the shipment requirement includes a list of preferred carriers of the plurality of carriers.

23. An article of manufacture comprising:

a computer usable medium having machine readable program code means embodied therein for receiving a shipment requirement for a shipment from a shipper over a computer network;

machine readable program code means for communicating the requirement to a plurality of carriers over the computer network;

machine readable program code means for receiving at least one quote for the shipment from the plurality of carriers over the computer network, the at least one quote being based on the requirement;

machine readable program code means for communicating to the shipper over the computer network the at least one quote for the shipment and additional information regarding the carrier that provided the at least one quote; and machine readable program code means for receiving a selection of one of the at least one quote from the shipper over the computer network, the selection being based on the at least one quote and the additional information regarding the carrier;

wherein the additional information regarding the carrier includes a quantitative measurement representing the carrier's previous reliability and performance, and the shipment requirement includes a list of preferred carriers of the plurality of carriers.

\* \* \* \* \*